United States Patent [19]

Bieganski

[11] 3,946,487
[45] Mar. 30, 1976

[54] TOOLS FOR CUTTING

[76] Inventor: Zdzislaw Bieganski, Brushwood, Kingsbourne Green, Harpenden, Hertfordshire, England

[22] Filed: Apr. 1, 1974

[21] Appl. No.: 456,666

[30] Foreign Application Priority Data
Aug. 6, 1973 United Kingdom............... 37165/73
Apr. 26, 1973 United Kingdom............... 19923/73

[52] U.S. Cl. .................... 30/90.7; 30/90.9; 30/91.1; 30/91.2
[51] Int. Cl.² .......................................... B21F 13/00
[58] Field of Search ......... 30/90.1, 90.3, 90.4, 90.6, 30/90.7, 90.8, 90.9, 91.1, 91.2, 92, 92.5, 94, 95

[56] References Cited
UNITED STATES PATENTS
1,866,095  7/1932  Foley .................................. 30/90.8
2,071,166  2/1937  Huffman ................................. 30/99
2,300,087  10/1942  Anello .................................. 30/90.9
2,346,227  4/1944  Martin et al. .......................... 30/90.9
2,830,366  4/1958  Chisena ................................ 30/90.9
3,082,523  3/1963  Modes et al. .......................... 30/90.9
3,213,718  10/1965  Maring ................................. 30/91.2
3,608,194  9/1971  Miller ................................... 30/94
3,722,092  3/1973  Lukas .................................. 30/90.9

*Primary Examiner*—Al Lawrence Smith
*Assistant Examiner*—Robert C. Watson
*Attorney, Agent, or Firm*—Marshall & Yeasting

[57] ABSTRACT

A tool for cutting the sheath of a cable has a loop frame and a cutter movable inwards and outwards of the frame to engage with the cable when the same is threaded through the loop, the cutter being controlled in position, according to the diameter of the cable and the thickness of its sheath, by a pin and slot mechanism.

16 Claims, 5 Drawing Figures

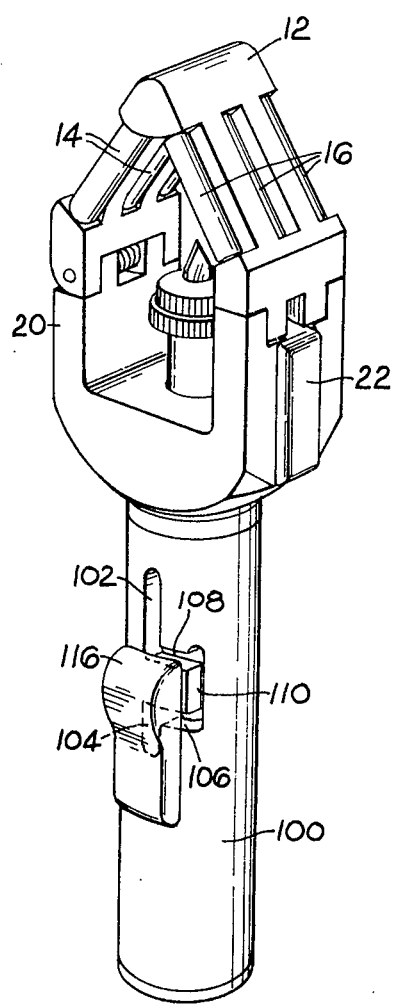
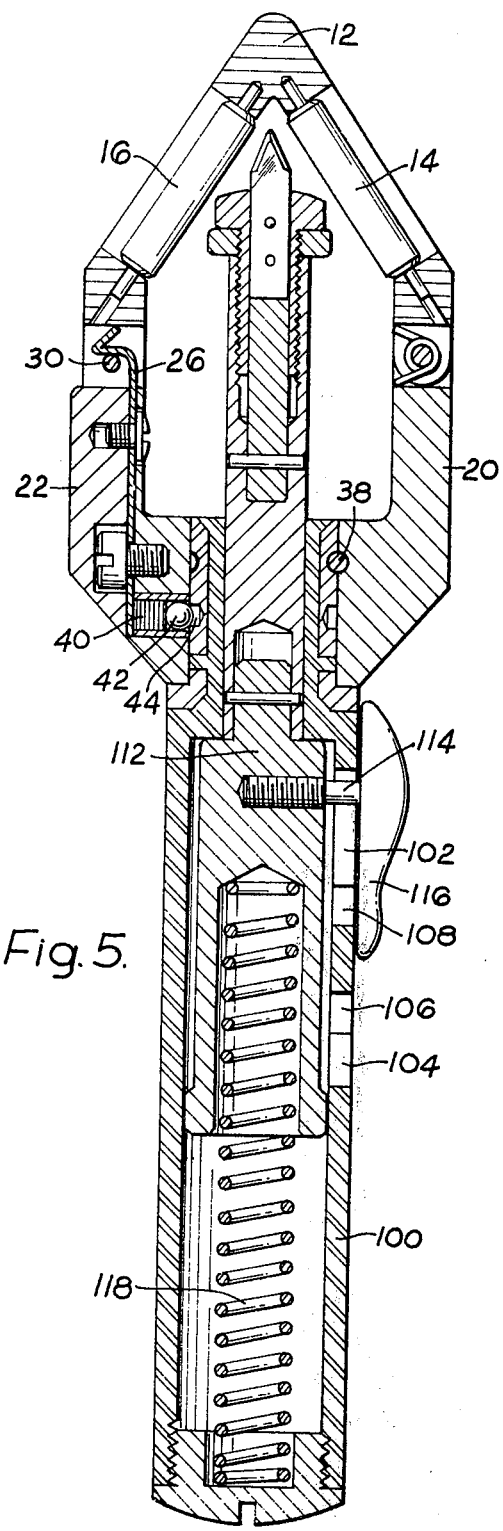
Fig. 4.
Fig. 5.

TOOLS FOR CUTTING

SUMMARY OF THE INVENTION

This invention relates to tools for cutting the sheath of cables or the like, as may be required to strip the outermost layers of insulation, or of armoured sheath of the cable.

In accordance with the present invention a tool for cutting the sheath of cable or like comprises a loop-like frame including at least two parts hinged together and catch means releasably holding them in the closed loop form, a handle extending away from the loop and a cutter which is adjustable in position inwardly and outwardly of the loop, the position of the cutter being controlled by pin and slot means.

Preferably the cutter is adapted to be held in at least two and possibly more angularly related positions relative to the loop frame. In one position the cutter blade may lie in a plane which is normal to the axis of the loop, and then when a cable extends through the loop on or parallel to the axis, the cutter may perform a circular cut around the perimeter of the cable as is required to separate an end portion of the sheath from the remaining sheath. In a second position, the blade extends at right angles to the first position so as to be able to make a cut along the length of the sheath, for example so that the sheath can be opened out and removed from the cable laterally. The further position will be inclined to the other two and between the other two and used to make helical cuts so that the sheath can be unwound from the cable.

In accordance with a preferred feature of the invention, a pair of rollers is provided in association with the cutter and located one on either side of the cutter for contacting the cable. These rollers may be movable with the cutter unit relative to the loop frame, and may also be adjustable angularly relative to the cutter so that they can either be located laterally of the line of cut or fore and aft along the line of cut, and may serve to minimise undesirable relative movements between the cable and tool and hence improve the efficiency of the cutting operation.

BRIEF DESCRIPTION OF THE DRAWINGS

FIG. 4 is a view similar to FIG. 1 but of a second embodiment; and

FIG. 5 is a view similar to FIG. 2 but of the second embodiment.

DESCRIPTION OF THE PREFERRED EMBODIMENTS

Figure 1:
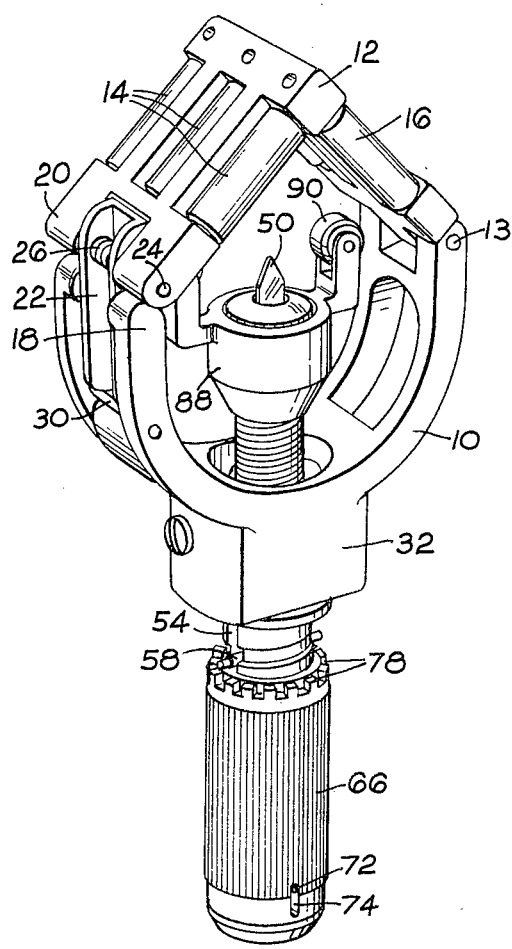
FIG. 1 is a perspective view of a first embodiment.
Figure 3:
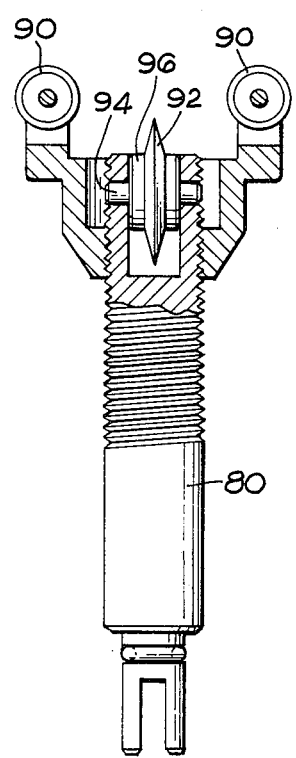
FIG. 3 is an elevation partly in section of an alternative cutter unit for use in the tool of FIGS. 1 and 2.
Figure 2:
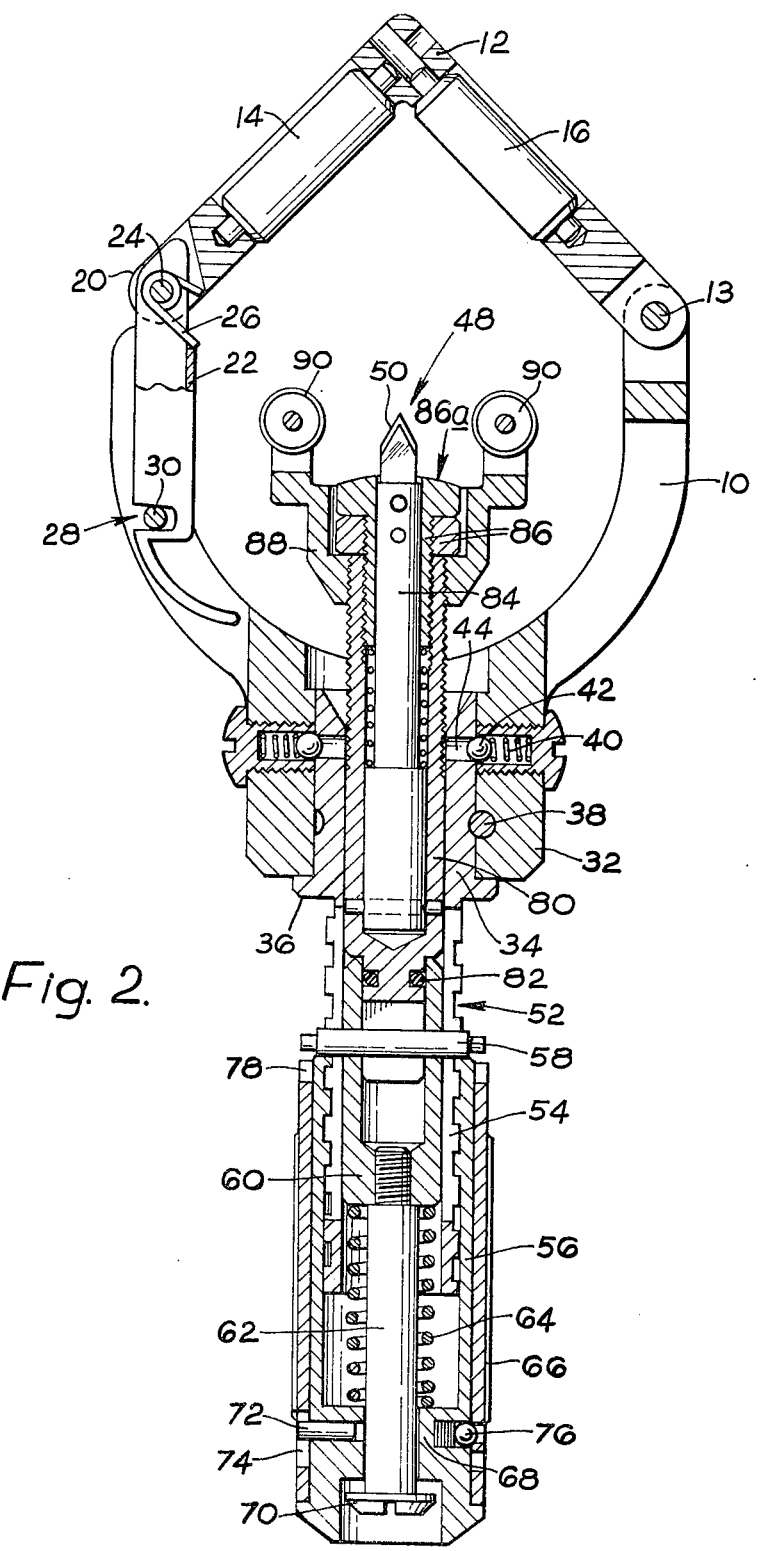
FIG. 2 is a longitudinal section of the same on a large scale.

Referring now to FIGS. 1 to 3 of the drawings and particularly to FIGS. 1 and 2 thereof, the tool shown therein comprises a loop frame comprising a V shaped portion 12 pivoted on pin 13 to one end of a C-shaped portion 10, and the two portions are releasably connected by a catch 22 pivoted on pin 24 and engaging pin 30 via jaw 28. Spring 26 normally ensures that the catch remains engaged.

The frame includes a tubular boss 32 which receives one end 34 of a tubular handle stem 52. Pin 38 holds the stem axially but permits rotation within the boss, and spring loaded detents 40,42 engaging in a series of pockets 44 hold the stem in any of a number of angular positions for the purpose explained.

The stem houses the cutter unit 48 which seats non-rotatably on a plug 60 which carries a cross pin 58 extending through axial slots 54 along the length of the stem. The stem is screw-threaded externally, and nut 56 is screw-engaged with the stem: handle sleeve 66 is angularly fast with the nut and is externally ribbed or otherwise treated to enable it to be gripped manually.

The maximum travel of the cutter outwards of the frame is controlled by the cross pin 58 abutting the rim or end of the nut 56, and hence rotation of the nut via sleeve 66 may move the cross pin along the slots to advance or withdraw the cutter unit.

Spring 64 trapped between the plug and a shoulder 68 in the nut urges the cutter unit inwards of the loop frame, and the maximum inwards movement, under the action of the spring and creating a gap between pin 58 and the adjacent end of the nut 56, is controlled by a hand 70 on pin 62 fast with the plug 60 and co-operating with shoulder 68.

In use, when the cutter penetrates a cable sheath, the pin 58 will be moved into contact with the end of the nut and against the spring 64. In order to fix the position of the nut and prevent inadvertent adjustment especially when the handle sleeve 66 is used to grip the tool and rotate the same about the cable, the sleeve is given a limited axial movement by means of a slot 74 in the same receiving a pin 72 carried by the nut, and may snap engage in either of two positions by virtue of a spring loaded ball 76 engaging alternate pockets in the sleeve. The sleeve end adjacent the pin is castellated at 78 and hence the pin 58 ends may slot into the castellations, and because of the axial slots 54 rotation of the nut about the stem is then prevented.

The cutter unit shown in FIG. 2 comprises an outer body 80 carrying "O" ring 82 for frictional engagement of the body in a bore in plug 60, and the end of the body is bifurcated to embrace pin 58 so as to hold the body fast angularly relative to the pin and hence to the handle. This body 80 houses a stem 84 which carries the cutter blade 50 and the stem is held angularly in the body by a pin.

Body 80 is screw-threaded internally and externally to accommodate a threaded liner and lock nut 86 which holds the stem in the body, and in the illustrated case also to mount a bracket 88 carrying rollers 90.

As shown in FIG. 2 the blade 50 is a flat blade fixed in position and lying in the plane of the loop frame. The rollers 90 are illustrated as lying fore and aft of the line of cut and this will be the normal position for these when the tool is used to make a circumferential cut and also when used to make a helical cut.

When the tool is used to make a longitudinal cut, the rollers 90 may be turned with the bracket 88 generally at right angles to the position illustrated in FIG. 2.

The rollers 90 will normally be adjusted so as to be in contact with the cable, and hence the cable will be supported not only at the normal three points (i.e. contact with rollers 14, 16 and cutter 50) but at these two additional points also. This will reduce any tendency for the cable to rock, or for bulges to form in the cable, and ensure that the cutting depth into the sheath is maintained constant.

The cutter unit of FIG. 2, comprising the body 80, the stem 84, the cutter 50, together with the liner, lock nut (and rollers 90) can be removed bodily and replaced for example by the cutter unit shown in FIG. 3 which uses a cutter wheel 92 journalled on pin 94 and having a shouldered hub 96 which acts to control the depth of cut in lieu of the face 86a of the liner 86.

It will be appreciated that as an alternative to interchanging units, the cutters may be removed, sharpened or repaired and replaced.

Turning now to FIGS. 4 and 5 of the drawings, the tool shown therein comprises a frame generally similar to that in FIGS. 1 to 3 and with like parts indicated by like reference numerals. The cutter unit also may be generally similar to either of those described hereinbefore, but a different cutter advance and retract system is employed as described below.

In this embodiment handle stem 100 has a gate slot including co-linear axial slots 102 104 each of which communicates at its adjacent end with a part peripheral slot 106 108 and the two latter are joined by a third axial slot 110.

The cutter unit is connected to a plug 112 which carries pin 114 projecting through the gate slot and fast with operating knob 116. Spring 118 urges the cutter inwardly of the loop frame.

It will be appreciated that the gate slot enables the cutter to be held in different positions axially, relative to the loop frame, that is to operate on different size cables, according to which portion of the slot receives the pin.

Further, the cutter can be retracted, against the spring to allow a cable to be inserted and the frame closed, and the spring then allowed to drive the cutter to a position in which it penetrates the cable sheath.

The arrangement shown may be considered as being usable for two different diameters of cables or groups of diameters of cables according to whether the pin extends through the slot 102 or 104, because when the pin is in the slot 110, the cutter unit is turned angularly slightly. However, the degree of turning may be comparatively small, and hence slot 110 can be considered to provide a third adjusted position for cables of diameters intermediate those of the other two positions.

Moreover it will be appreciated that more complex slot shapes can be provided, for the purpose of providing a greater range of adjusted positions.

I claim:

1. A tool for cutting the sheath of a cable or the like, comprising a loop-like frame including at least two parts hinged together and catch means releasably holding them in closed loop form, a handle extending away from the loop, a cutter which is adjustable in position inwardly and outwardly of the loop, the position of the cutter being controlled by pin and slot means, a pair of rollers carried on a bracket which is displaceable with said cutter, and a body which houses the cutter and which has a screw connection with said bracket by means of which said bracket is adjustable relative to said body and cutter.

2. A tool for cutting the sheath of a cable or the like, comprising a loop-like frame including at least two parts hinged together and catch means releasably holding them in closed loop form, a handle extending away from the loop, a cutter which is adjustable in position inwardly and outwardly of the loop, means for maintaining the cutter in any one of a plurality of adjusted positions, a plurality of rollers mounted in the loop-like frame with their axes in the form of a V, the cutter being adjustable along a line into the V and toward the apex thereof.

3. A tool according to claim 2 in which one frame part is formed with an aperture through which said cutter extends, and in which the handle is aligned with said aperture, means being provided to couple the handle to the cutter, said coupling means being operable to advance the cutter incrementally toward and away from the apex of said V, and said handle having one end thereof journalled in the aperture for angular movement about its axis, detent means being provided to releasably retain the handle in any one of a plurality of angular positions relative to said frame part.

4. A tool according to claim 2 in which the handle comprises a first part which is fixed axially relative to one frame part and comprises a second part which is axially displaceable relative to said first part and said frame part toward the apex of the V, along the aforesaid line, adjustable means being provided on the first part operable to effect incremental displacement of the second part toward and away from the apex of the V, the cutter being carried by said second part, and said frame part including an aperture through which said cutter extends.

5. A tool according to claim 4 in which said adjustable means comprises slot means formed in said first handle part and a radial pin carried by the second handle part, the pin projecting through said slot means and being provided with a head externally of said first part, and said slot means comprising at least two axial sections and transverse sections joining the axial sections.

6. A tool according to claim 4 in which said first handle part is journalled in the aperture in said frame part for angular movement relative thereto, and including detent means for releasably retaining the first part in any one of a plurality of angular positions.

7. A tool according to claim 4 in which said adjustable means comprises a sleeve connected to said first handle part by complementary lead screw threads whereby rotation of the sleeve causes it to advance axially relative to said first part, and a radial pin connected to the second handle part and projecting through the axial slot in the first part so as to be in the path of movement of the sleeve.

8. A tool according to claim 7 in which the sleeve which encounters the projecting pin comprises inner and outer portions which are slidable relative to one another, detent means being provided to normally hold the outer sleeve in a retracted position in which the end of the inner sleeve portion, which is nearest said one frame member, is in advance of the corresponding end of the outer sleeve portion, the latter end being castellated for engagement with said projecting pin when the outer sleeve is advanced forwardly of the inner sleeve portion.

9. A tool according to claim 4 in which the cutter comprises a blade mounted in a support which is attached to said second handle part.

10. A tool according to claim 9 in which said support and said second handle part interfit by means of a spigot and socket connection and wherein the support is held releasably in interfitting relation with said second handle part by a resiliently-deformable element whereby the cutter can be readily detached for replacement.

11. A tool according to claim 9 in which the support carries at least one roller which is located within the confines of said closed loop.

12. A tool according to claim 9 in which the blade is adjustable axially relative to the support to vary the extent to which the cutting edge of the blade is exposed.

13. A tool according to claim 9 in which the support carries a pair of rollers which are located within the confines of said loop, one on each side of the blade.

14. A tool according to claim 13 in which the rollers are carried on a bracket which is adjustable relative to the support in directions towards and away from the apex of the V.

15. A tool according to claim 14 in which the bracket is adjustable angularly relative to the support.

16. A tool according to claim 15 in which the bracket is screw-threadedly connected to the support.

* * * * *